US012416879B2

(12) United States Patent
Ma et al.

(10) Patent No.: US 12,416,879 B2
(45) Date of Patent: Sep. 16, 2025

(54) DETENT DEVICE FOR TONER CONTAINER, ROTATING DISC, AND CONVEYING DEVICE

(71) Applicant: BEIJING XINTRON OFFICE EQUIPMENT CO., LTD., Beijing (CN)

(72) Inventors: Xuewen Ma, Beijing (CN); Haifeng Geng, Beijing (CN)

(73) Assignee: BEIJING XINTRON OFFICE EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/564,063

(22) PCT Filed: Sep. 22, 2021

(86) PCT No.: PCT/CN2021/119498

§ 371 (c)(1),
(2) Date: Nov. 25, 2023

(87) PCT Pub. No.: WO2022/247071

PCT Pub. Date: Dec. 1, 2022

(65) Prior Publication Data

US 2024/0264551 A1 Aug. 8, 2024

(30) Foreign Application Priority Data

May 26, 2021 (CN) ......................... 202110578652.3

(51) Int. Cl.
*G03G 15/08* (2006.01)

(52) U.S. Cl.
CPC . *G03G 15/0872* (2013.01); *G03G 2215/0668* (2013.01)

(58) Field of Classification Search
CPC ....... G03G 15/0872; G03G 2215/0668; G03G 15/0887; G03G 15/0898; G03G 21/1676; G03G 15/0865; G03G 15/08
See application file for complete search history.

(56) References Cited

U.S. PATENT DOCUMENTS

| | | | | |
|---|---|---|---|---|
| 2002/0057932 A1* | 5/2002 | Aizawa | G03G 15/0194 | 399/302 |
| 2007/0147902 A1* | 6/2007 | Taguchi | G03G 15/0872 | 399/262 |
| 2017/0351197 A1* | 12/2017 | Geng | G03G 15/0889 | |
| 2021/0103233 A1* | 4/2021 | Erickson | G03G 15/0872 | |

* cited by examiner

*Primary Examiner* — Sandra Brase

(57) ABSTRACT

A detent device for a toner container includes a detent main body (1-3), and a detent mouth (1-1) which is located at one side of the detent main body (1-3) and has a U-shaped, C-shaped, V-shaped, L-shaped, groove-shaped, trapezoidal or curved structure. A rotating disc for a toner container includes a rotating disc main body (3-8), a detent device mounted on the rotating disc main body (3-8) and includes a detent mouth (1-1), a fixed gear (7) connected with the rotating disc main body (3-8), a detent gear (5) linked with the detent device, and a bridge gear (6) engaged between the detent gear (5) and the fixed gear (7). A conveying device for a toner container includes the rotating disc. The present invention has a good structural sealing performance, is simple, and has less abrasion between parts; key structures are not damaged; and the maintenance cost is reduced.

10 Claims, 13 Drawing Sheets

(A)

(B)

(C)

(A)

(B)

(C)

DETENT DEVICE FOR TONER CONTAINER, ROTATING DISC, AND CONVEYING DEVICE

BACKGROUND OF THE PRESENT INVENTION

Field of Invention

The present invention relates to the installation technique of toner containers, and more particularly to a conveying device for a toner container.

Description of Related Arts

For printers and copiers, toner containers are very important. Cartridges need to be replaced frequently, and accordingly, new cartridges are installed frequently. U.S. Ser. No. 10/209,667 B2 discloses a developer supplier in which the slideway is used in combination with the sliding shaft, referring to FIG. 34. However, in this way, the friction force is large, resulting in easy wear of key parts. Therefore, it is an urgent problem to be solved that the installation structure has good sealing performance, has less wear of parts, and is simple, and the key structure is not damaged.

SUMMARY OF THE PRESENT INVENTION

Aiming at deficiencies in the prior art, the present invention provides a detent device for a toner container, wherein the detent device comprises a disc-shaped detent main body, and a detent mouth which is located at one side of the detent main body and has a U-shaped, C-shaped, V-shaped, L-shaped, groove-shaped, trapezoidal or curved structure.

Preferably, the detent device further comprises a fixed shaft which is located at another side of the detent main body for connecting with an external device.

Also, the present invention provides a rotating disc for a toner container, the rotating disc comprising:

- a rotating disc main body;
- a detent device installed on the rotating disc main body, wherein the detent device comprises a detent mouth;
- a fixed gear connected with the rotating disc main body, wherein the rotating disc main body is able to rotate relatively to the fixed gear;
- a detent gear linked with the detent device; and
- a bridge gear which is set between the detent gear and the fixed gear, and is engaged with the detent gear and the fixed gear respectively for achieving torque transmission.

Preferably, the rotating disc main body has a stop notch at a peripheral edge thereof for limiting a rotating stroke of the rotating disc main body.

Preferably, a spring rod is located at an inner side of the rotating disc main body for connecting with an external spring.

Preferably, a stop block is set on the fixed gear for preventing the fixed gear from rotating.

Preferably, the bridge gear, which is installed on a bridge gear fixed rod located on the rotating disc main body, is able to rotate through clearance fit.

Preferably, the detent device is installed within a trough provided at an outer side of the rotating disc main body; the fixed gear, the detent gear and the bridge gear are all installed at an inner side of the rotating disc main body.

Also, the present invention provides a conveying device for a toner container, the conveying device comprising:

- a rotating disc comprising:
  - a rotating disc main body;
  - a detent device installed on the rotating disc main body, wherein the detent device comprises a detent mouth;
  - a fixed gear connected with the rotating disc main body, wherein the rotating disc main body is able to rotate relatively to the fixed gear;
  - a detent gear linked with the detent device; and
  - a bridge gear engaged between the detent gear and the fixed gear for achieving torque transmission; and
- an upper cover main body which comprises a rotating disc rod, wherein the rotating disc rod simultaneously passes through a second gear and the rotating disc.

Preferably, a spring rod is located at an inner side of the rotating disc main body for connecting with an external spring, a spring plunger is set on the upper cover main body, and a tension spring is connected between the spring plunger and the spring rod.

Preferably, the rotating disc main body has a stop notch at a peripheral edge thereof; a stop rod is set on the upper cover main body and is fitted with the stop notch to limit a rotating stroke of the rotating disc.

Preferably, the rotating disc main body has a stop notch at a peripheral edge thereof for limiting a rotating stroke of the rotating disc main body, a spring rod is located at an inner side of the rotating disc main body for connecting with an external spring.

The present invention has beneficial effects as follows. The sliding friction of the present invention is rotational friction. The present invention has good sealing performance, has less wear of parts, and is simple, and the key structure is not damaged, thereby maintenance costs.

BRIEF DESCRIPTION OF THE DRAWINGS

In order to understand the present invention more easily, the present invention will be described in detail by the specific embodiments and accompanying drawings as follows. However, these drawings only disclose typical implementation of the present invention and should not be considered as limiting the protection scope of the present invention.

Figure 1:
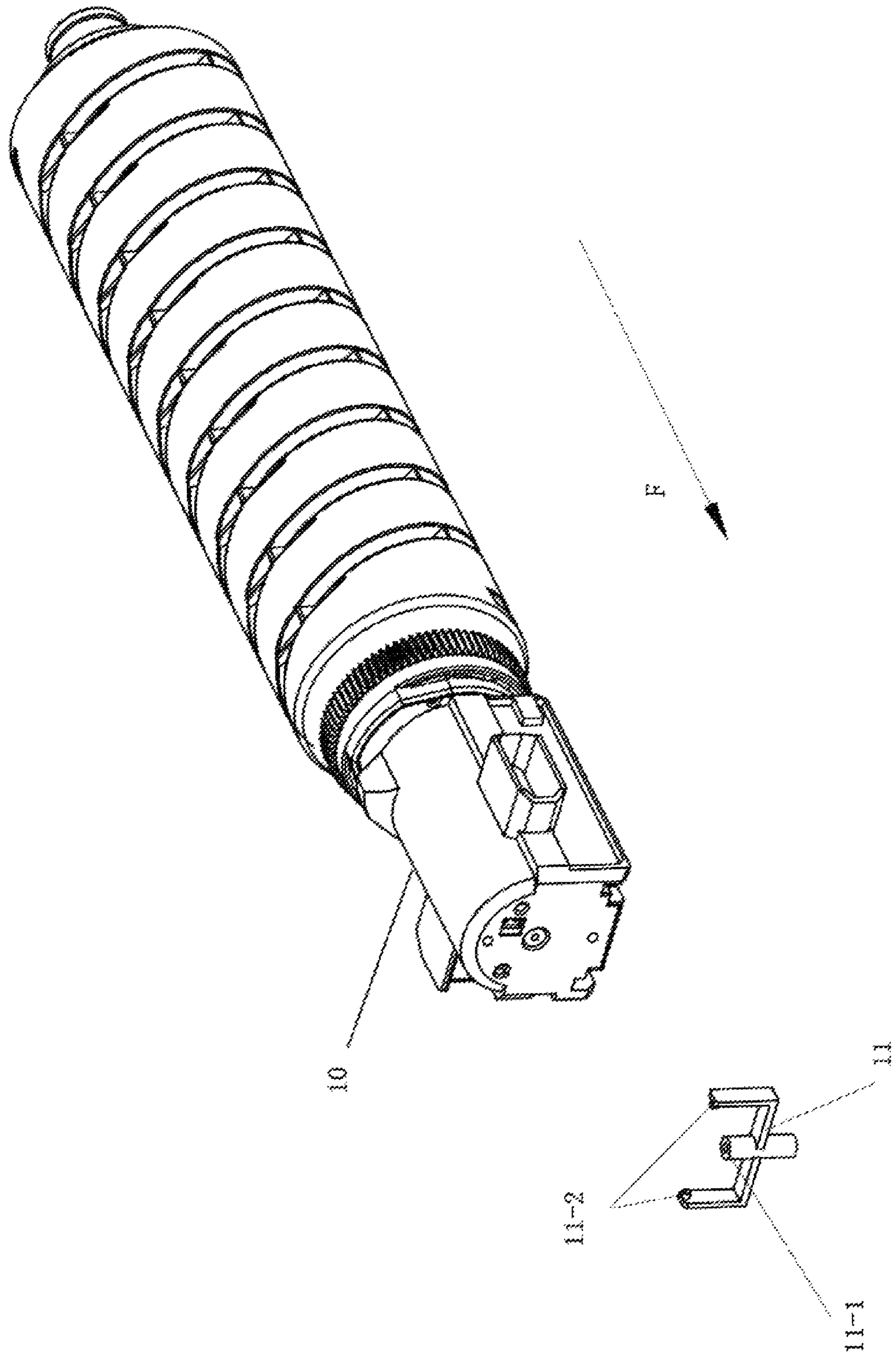
FIG. 1 shows the combination installation of a toner collection device and a toner container.

| Reference characters: |
| --- |
| 10: toner container; 10-1: toner discharge mouth;<br>11: toner collection device; 11-1: toner collection mouth; 11-2: arm;<br>1: detent device; 1-1: detent mouth; 1-2: fixed shaft; 1-3: detent main body;<br>3: rotating disc; 3-1: centre hole; 3-2: detent hole; 3-3: first stop notch; 3-4: bridge gear fixed rod; 3-5: spring rod; 3-6: fixed rod hole; 3-7: second stop notch; 3-8: rotating disc main body;<br>5: detent gear; 5-1: detent gear hole;<br>6: bridge gear; 6-1: bridge gear hole;<br>7: fixed gear; 7-1: stop block; 7-2: fixed gear hole;<br>8: upper cover main body; 8-1: stop rod; 8-2: rotating disc rod; 8-3: spring plunger; 8-4: stop piece; 8-5: jump spring groove; 8-6: tension spring groove;<br>9: fixed plug; 9-1: plug fixed rod;<br>10: tension spring. |

DETAILED DESCRIPTION OF THE PREFERRED EMBODIMENT

The embodiments of the present invention are described with reference to accompanying drawings as follows, so that those skilled in the art are able to better understand and implement the present invention. However, these embodiments are not the limitation of the present invention. In the absence of conflict, these embodiments and the technical features in these embodiments are able to be combined with each other, in which the same elements are represented by the same reference characters.

Figure 2:
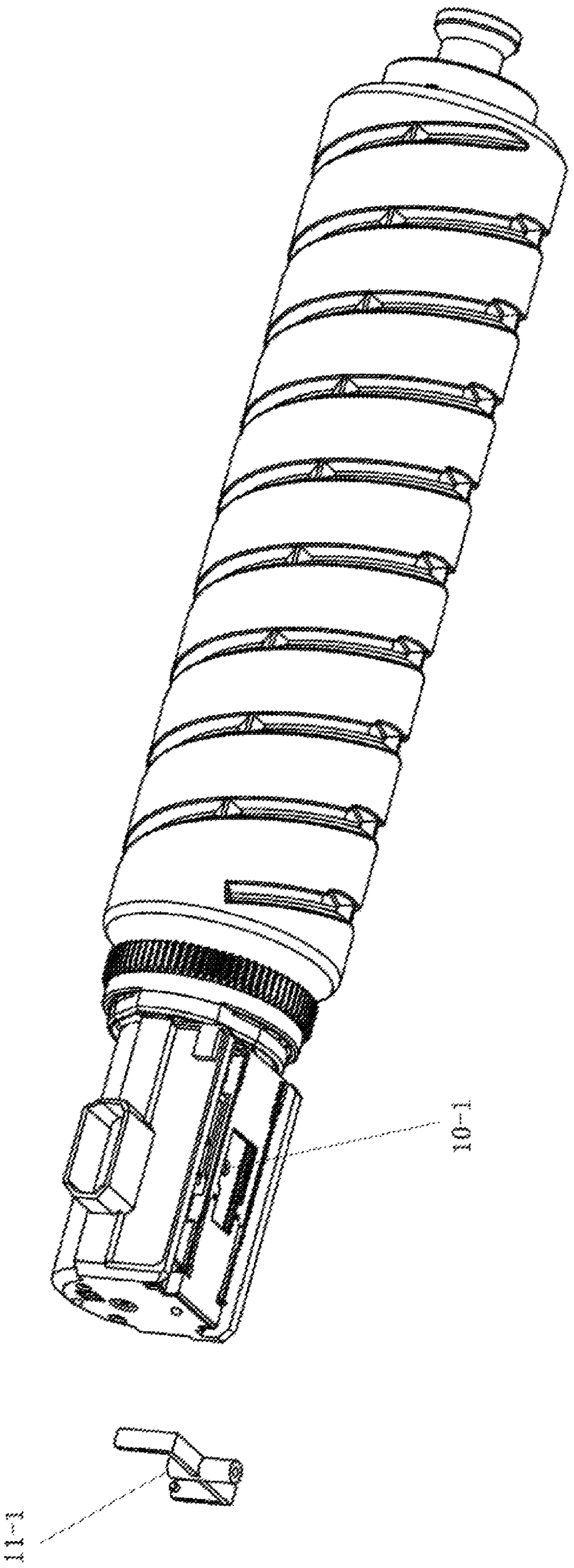
FIG. 2 shows the combination installation of the toner collection device and the toner container at another angle.
Figure 11:
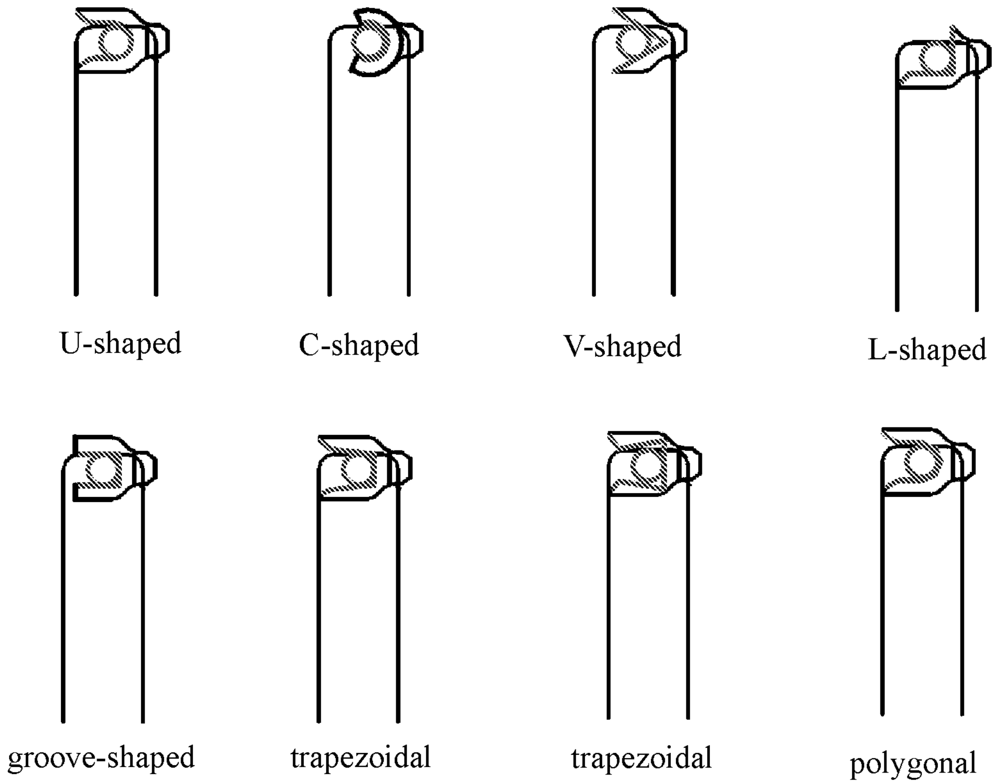
FIG. 11 is a stereogram of the detent device in other implementation provided by the present invention.
Figure 12:
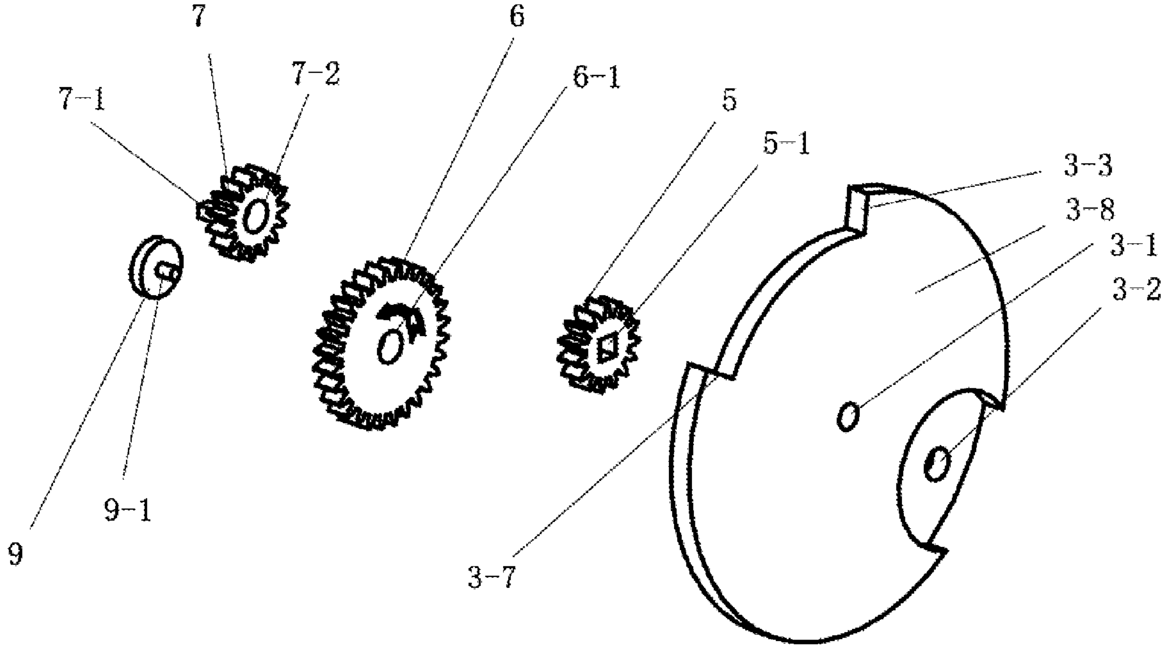
FIG. 12 is an exploded view of a rotating disc provided by the present invention.
Figure 13:
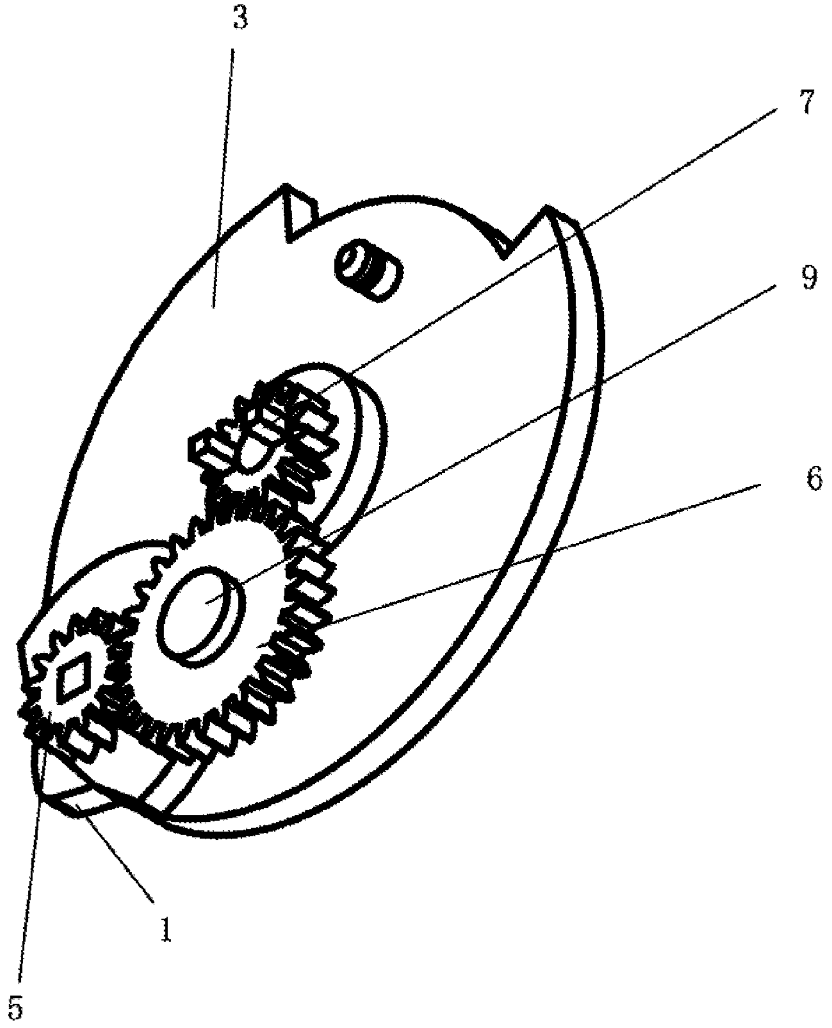
FIG. 13 is a stereogram after installing the rotating disc.

Referring to FIGS. 1 and 2, a toner collection device 11 comprises two arms 11-2 at two ends thereof respectively, and two protrusions are located at two inner side surfaces of the two arms 11-2 opposite to each other for engaging with two detent mouths 1-1 of two detent devices 1 (as shown in FIGS. 11 to 13). A toner collection mouth 11-1 is located between the two arms 11-2. When the toner collection device 11 is engaged with a toner container 10, the toner collection mouth 11-1 of the toner collection device 11 is aligned with a toner discharge mouth 10-1 of the toner container 10 for sealing. The alignment process is as follows. The toner container 10 is inserted between the two arms 11-2 of the toner collection device 11, the two arms 11-2 are lifted up, so that the toner collection mouth 11-1 is fitted closely to the toner discharge mouth 10-1 of the toner container 10, so as to achieve aligning and sealing. As a result, the toners inside the toner container enter the toner collection mouth 11-1 of the toner collection device 11 through the toner discharge mouth 10-1, thus the toners are conveyed.

Figure 3:
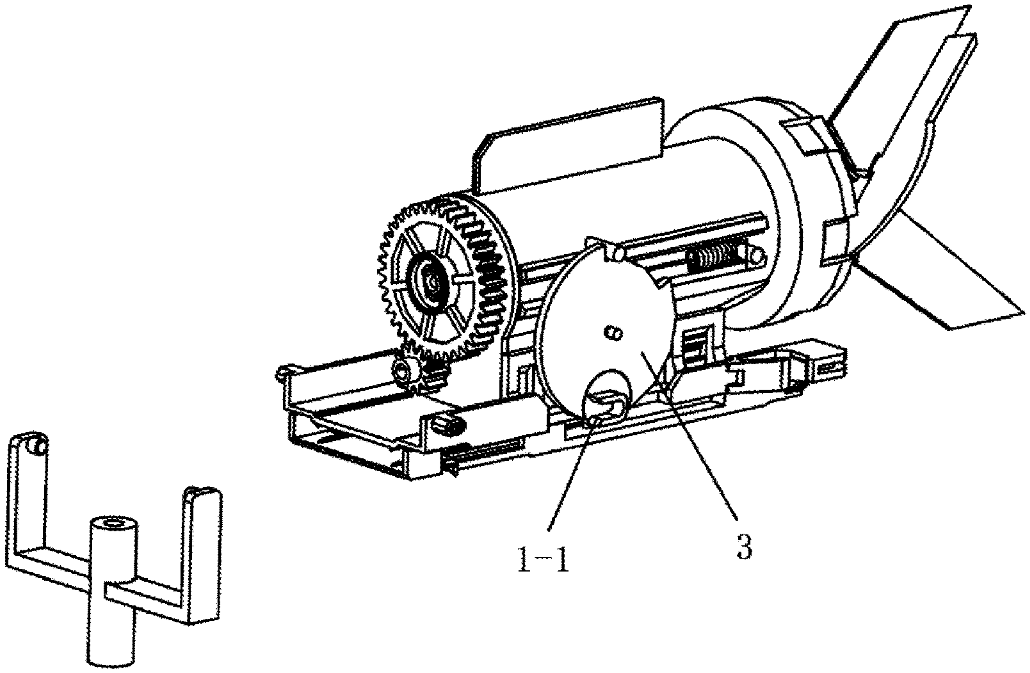
FIG. 3 is a stereogram of the toner container without upper cover.

FIG. 3 is a stereogram of the toner container after removing a top cover and a toner cartridge. A rotating disc 3 is set at one side of the toner container 10. A detent device 1 is set on the rotating disc 3. The detent device 1 comprises a detent mouth 1-1 for accommodating one protrusion which is located at an inner side surface of one of the two arms 11-2.

Figure 4:
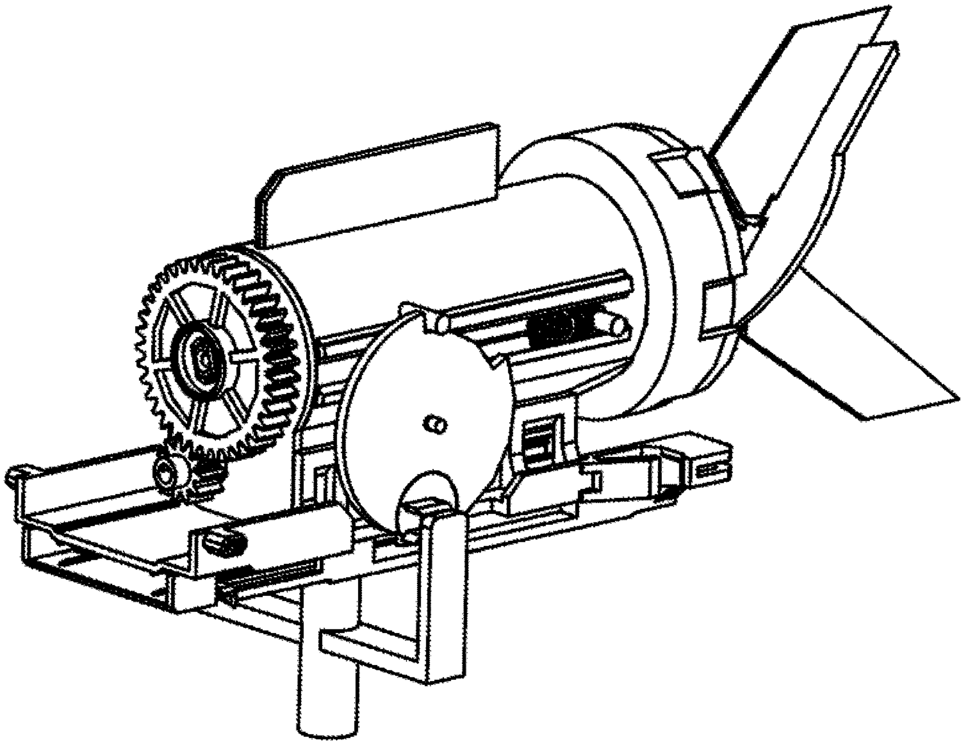
FIG. 4 is a stereogram of the toner collection device and the toner container at the beginning of combination installation.
Figure 5:
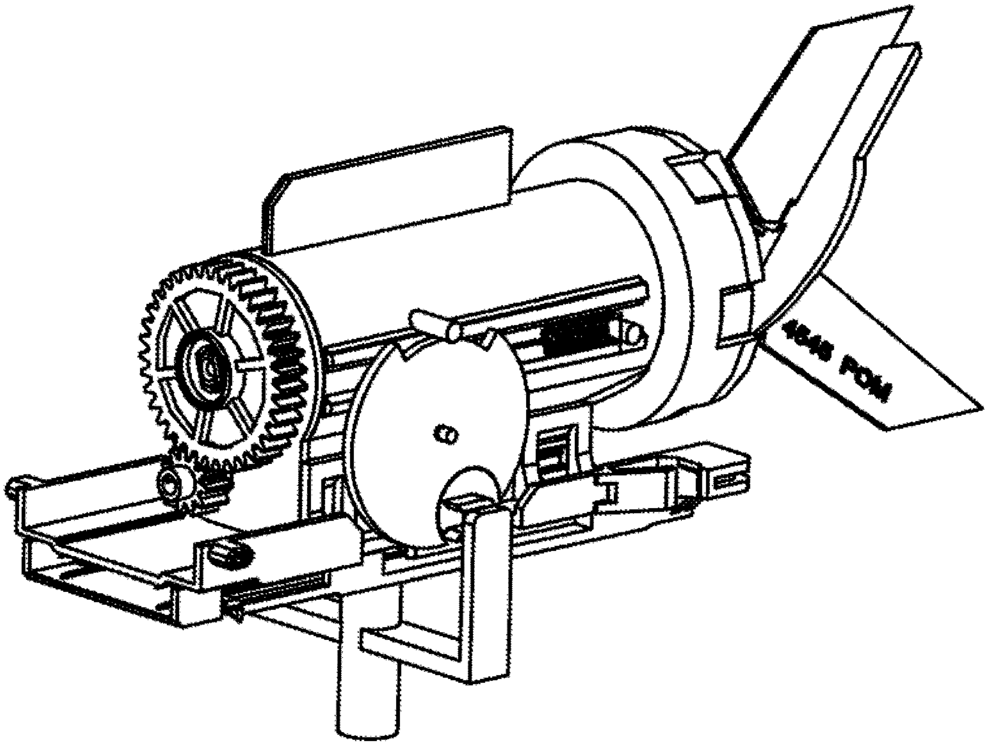
FIG. 5 is a stereogram of the toner collection device and the toner container during combination installation.
Figure 6:
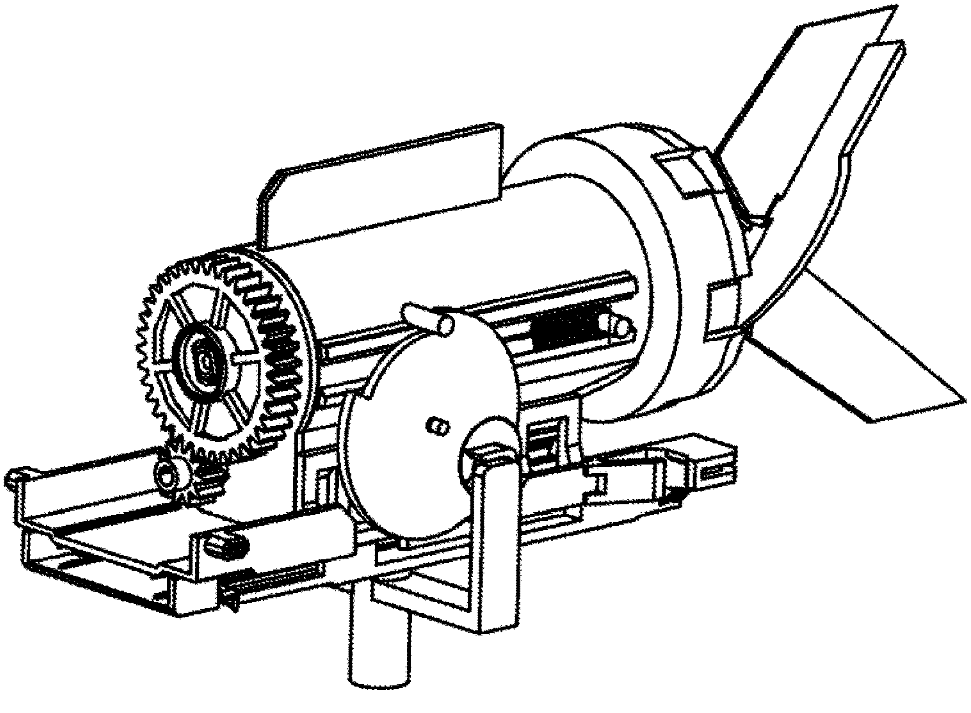
FIG. 6 is a stereogram after completing the combination installation of the toner collection device and the toner container.

As shown in FIG. 4, the toner container 10 is pushed between the two arms 11-2 of the toner collection device 11, and then the two arms 11-2 are respectively inserted into two detent mouths 1-1 after continuous push-in. With the further push-in of the toner container 10, the rotating disc 3 begins to rotate counterclockwise, and accordingly, the detent mouth 1-1 is driven to rise for driving the toner collection device 11 to rise (referring to FIG. 5), till the toner collection mouth 11-1 of the toner collection device 11 is fitted closely to and aligned with the toner discharge mouth 10-1 of the toner container 10, so that a passage is formed (referring to FIG. 6).

Figure 7:
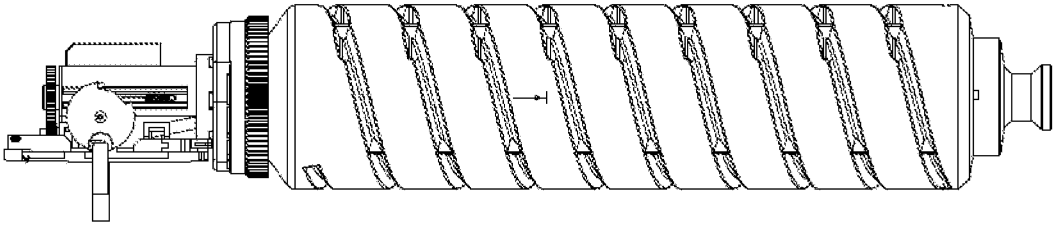
FIG. 7 is a main view, a bottom view and a section view of the toner collection device and the toner container at the beginning of combination installation.
Figure 7:
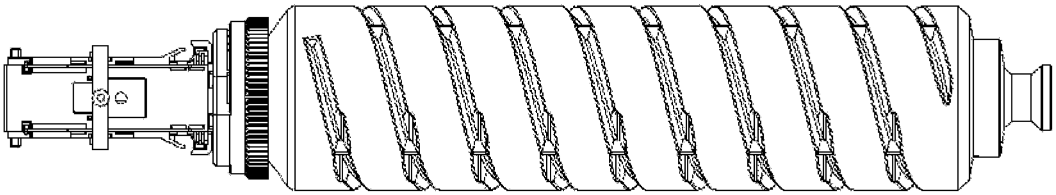
Figure 7:
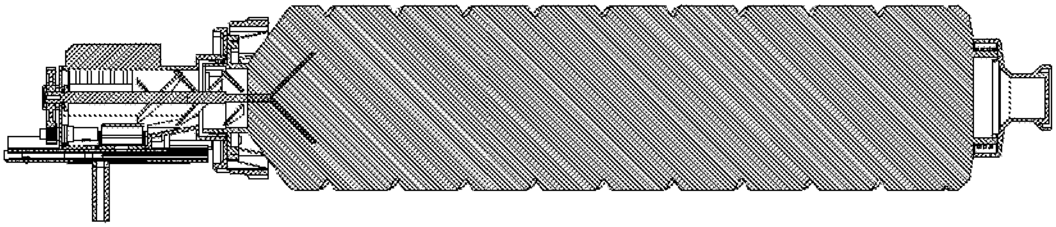

FIG. 7 shows a positional relationship between the toner collection mouth 11-1 of the toner collection device 11 and the toner discharge mouth 10-1 of the toner container 10 before the rotating disc 3 rotates. In FIG. 7, a main view, a bottom view and a section view are shown from top to bottom, respectively. Obviously, it is able to seen that the toner collection mouth 11-1 is misaligned with the toner discharge mouth 10-1.

Figure 8:
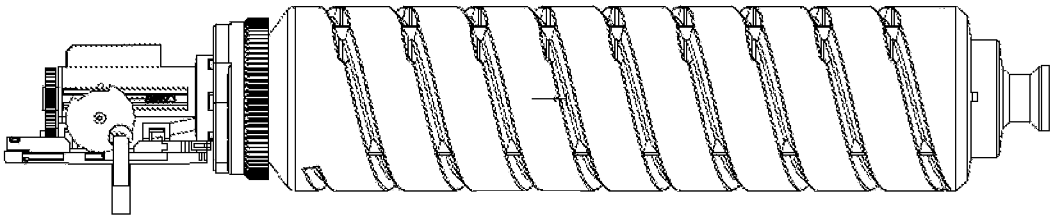
FIG. 8 is a main view, a bottom view and a section view of the toner collection device and the toner container after completing the combination installation.
Figure 8:
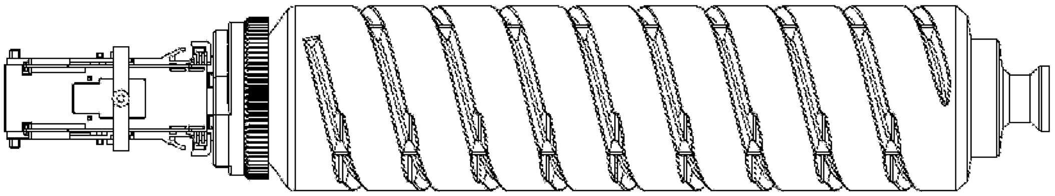
Figure 8:
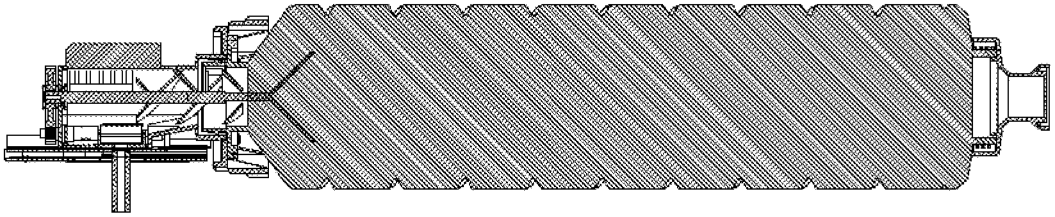

FIG. 8 shows a positional relationship between the toner collection mouth 11-1 of the toner collection device 11 and the toner discharge mouth 10-1 of the toner container 10 after the rotating disc 3 rotates. In FIG. 8, a main view, a bottom view and a section view are shown from top to bottom, respectively. Obviously, it is able to seen that the toner collection mouth 11-1 is fitted closely to and aligned with the toner discharge mouth 10-1.

Figure 9:
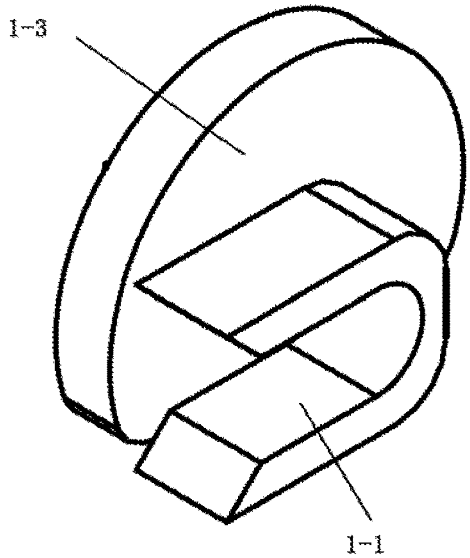
FIG. 9 is a stereogram of a detent device in one implementation provided by the present invention.

FIG. 9 show the rising process from a side view.

The removal process of the toner container 10 is opposite to the insertion process thereof. As the toner container is pulled out in an opposite direction of insertion, the rotating disc 3 rotates clockwise, and accordingly, the detent mouth 1-1 is driven to decline for driving the toner collection device 11 to decline, such that the toner collection mouth 11-1 of the toner collection device 11 is separated from the toner discharge mouth 10-1 of the toner container 10, thus the conveying of the toners is stopped.

Figure 10:
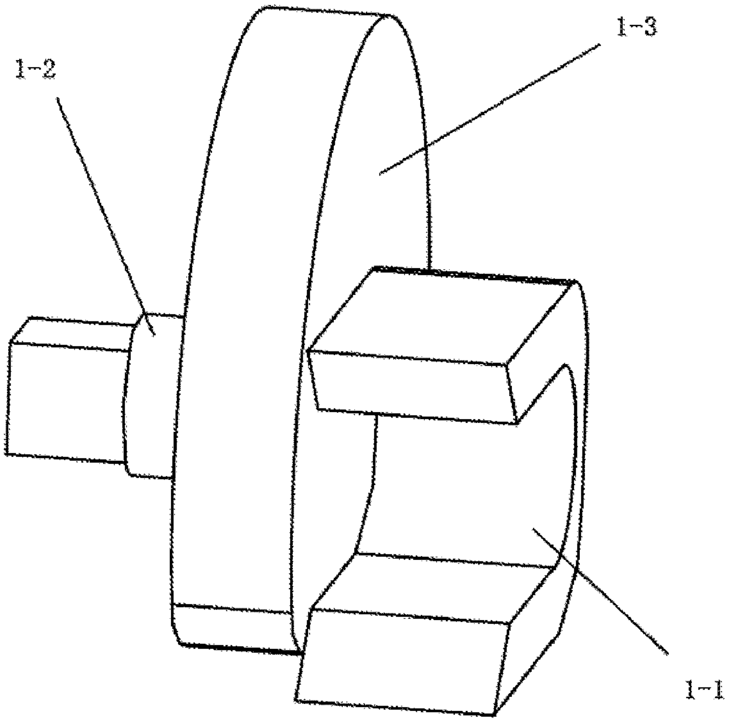
FIG. 10 is a stereogram of the detent device in another implementation provided by the present invention.

FIGS. 9 and 10 are structural schematic views of the detent device 1. The detent device 1 comprises a detent main body 1-3, a detent mouth 1-1 and a fixed shaft 1-2. The detent main body 1-3 is semicircular disc-shaped. The detent mouth 1-1, having a U-shaped structure, is located at an outer side of the detent main body 1-3. The fixed shaft 1-2 is located at an inner side of the detent main body 1-3. The fixed shaft 1-2 passes through a detent hole 3-2 of the rotating disc 3 for installing the detent device 1 on a rotating disc main body 3-8 of the rotating disc 3, and simultaneously passes through a detent gear hole 5-1 of a detent gear 5 which is located at an inner side of the rotating disc main body 3-8, for connecting the detent device 1 with the detent gear 5, so that the detent device 1 is able to drive the detent gear 5 to rotate.

FIG. 11 shows other shapes of the detent device 1. It is able to be seen that the detent mouth 1-1 is U-shaped, C-shaped, V-shaped, L-shaped, groove-shaped, trapezoidal or polygonal.

FIG. 12 is an exploded view of the rotating disc 3. FIG. 13 shows an assembled diagram of FIG. 12.

The rotating disc main body 3-8 of the rotating disc 3 is disc-shaped. A centre hole 3-1 is provided in a middle of the rotating disc main body 3-8. A notch, which comprises a first stop notch 3-3 and a second stop notch 3-7, is provided at a peripheral edge of the rotating disc main body 3-8. The centre hole 3-1 is aligned with a fixed gear hole 7-2 of a fixed gear 7 for allowing the insertion of a rotating disc rod 8-2, referring to FIG. 15. The fixed gear 7 comprises a stop block 7-1 for cooperating with an external connecting device, such as a stop piece 8-4 of an upper cover main body 8 (referring to FIG. 15), so that the fixed gear 7 is unable to rotate while the rotating disc 3 rotates.

The transmission between the fixed gear 7 and the detent gear 5 is achieved through a bridge gear 6. The bridge gear 6 has a bridge gear hole 6-1. A bridge gear fixed rod 3-4, which is located at the inner side of the rotating disc main body 3-8, is inserted into the bridge gear hole 6-1. The bridge gear fixed rod 3-4 has a fixed rod hole 3-6. A plug fixed rod 9-1 of a fixed plug 9 is inserted into the fixed rod hole 3-6. As a result, the bridge gear 6 is connected with the rotating disc main body 3-8, and is able to rotate relatively to the rotating disc main body 3-8.

Figure 14:
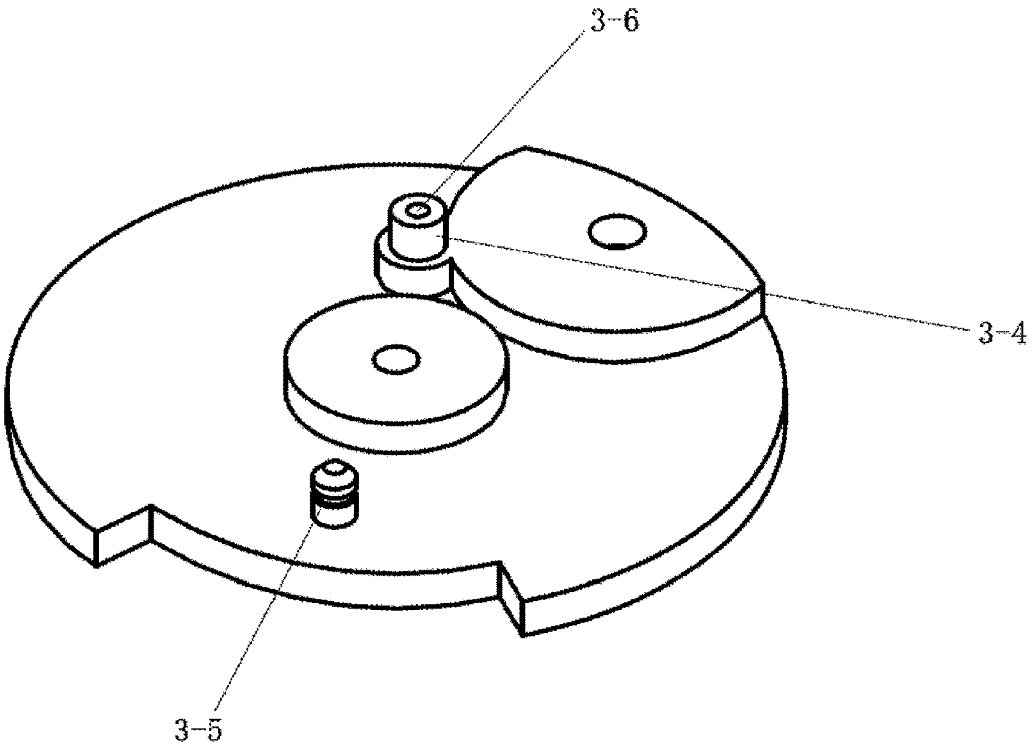
FIG. 14 is a stereogram of the rotating disc at another angle.

FIG. 14 is a stereogram showing the inner side of the rotating disc main body 3-8. A spring rod 3-5 is located at the inner side of the rotating disc main body 3-8 near the notch for connecting with a spring of an external connecting device, such as a spring plunger 8-3, referring to FIG. 15.

As shown in FIG. 12, the fixed plug 9 comprises a disc-shaped plug main body and a plug fixed rod 9-1 for rotatably installing the bridge gear 6 on the bridge gear fixed rod 3-4 of the rotating disc 3. The bridge gear 6 is able to flexibly rotate relatively to the rotating disc 3 through clearance fit.

Figure 15:
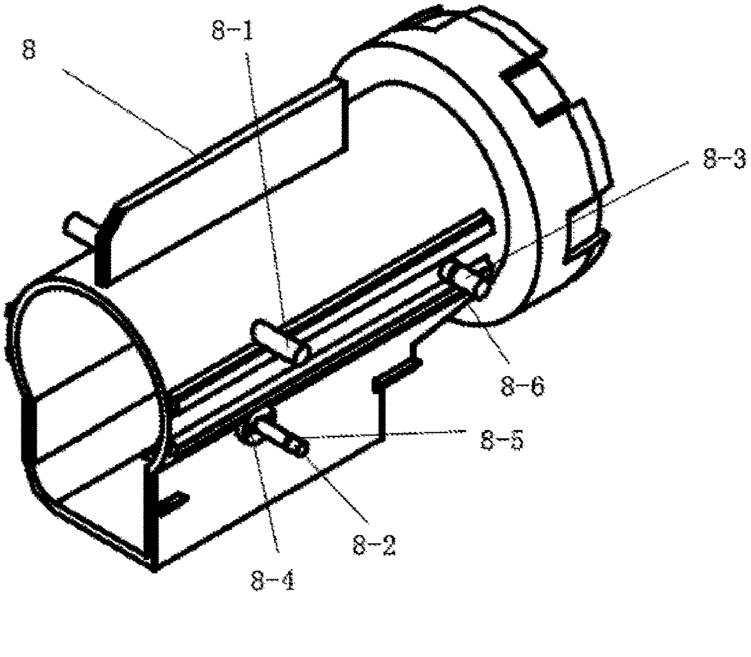
FIG. 15 is a stereogram of an upper cover main body.

FIG. 15 shows an external connecting device which is cooperated with the rotating disc 3. The external connecting device may a part of the toner container 10. A rotating disc rod 8-2, which is located on the upper cover main body 8, is simultaneously inserted into the fixed gear hole 7-2 of the fixed gear 7 and the center hole 3-1 of the rotating disc 3. The stop block 7-1 of the fixed gear 7 is fitted with the stop piece 8-4 of the upper cover main body 8 for stopping rotation. Therefore, the fixed gear is cooperated with the first stop notch 3-3 and the second stop notch 3-7 to limit the rotation stroking of the rotating disc 3. When the stop rod 8-1 is against the first stop notch 3-3, the toner container 10 is docked with the toner collection device 11. When the stop rod 8-1 is against the second stop notch 3-7, the toner container 10 is separated from the toner collection device 11. The spring plunger 8-3 is located on the upper cover main body 8, a tension spring groove 8-6 is provided on the spring plunger 8-3, and a tension spring 100 is fixed on the spring plunger 8-3 and the spring rod 3-5 of the rotating disc 3, referring to FIG. 19.

Figure 16:
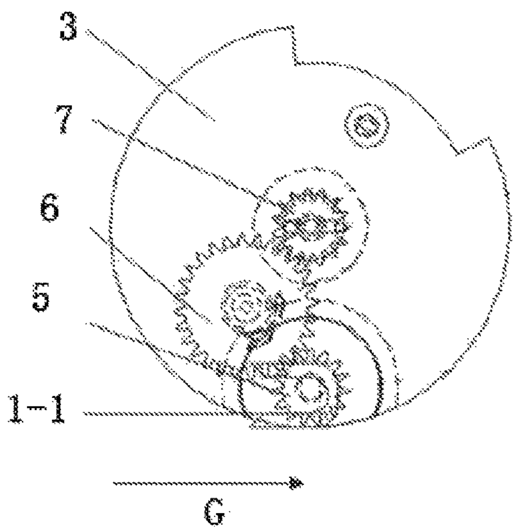
FIG. 16 is a side perspective view of the rotating disc.
Figure 18:
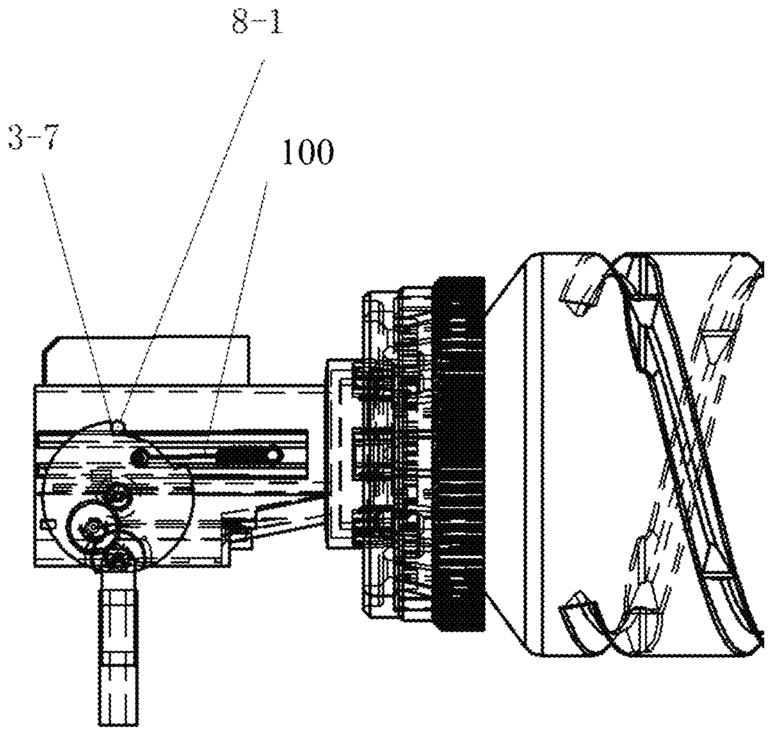
FIG. 18 is a schematic diagram of the rotating disc in one state.

FIG. 16 shows the working state of the rotating disc 3. The toner container 10 is inserted between the two arms 11-2 of the toner collection device 11, the protrusion located on each of the two arms 11-2 is inserted into the U-shaped detent mouth 1-1, the two arms 11-2 are continuously driven along an arrow direction, namely, a thrust F from each of the two arms 11-2 is applied to the detent mouth 1-1, and the detent device 1 transfers a thrust G to the rotating disc 3. Since the fixed gear 7 is unable to rotate, the rotating disc 3 is driven to rotate counterclockwise. Accordingly, the tension spring 100 is stretched through the spring rod 3-5 of the rotating disc, as shown in FIG. 18. One end of the tension spring 100 is fixed with the tension spring groove 8-6 of the spring plunger 8-3 (referring to FIG. 15), and another end of the tension spring 100 is fixed on the spring rod 3-5.

Since the fixed gear 7 does not rotate relatively to the rotating disc main body, the rotating disc 3 counterclockwise rotates to drive the bridge gear 6 to counterclockwise rotate, so as to further drive the detent gear 5 to clockwise rotate. The detent gear 5 drives the detent device to clockwise rotate, and the mouth direction of the detent mouth 1-1 remains unchanged.

Figure 17:
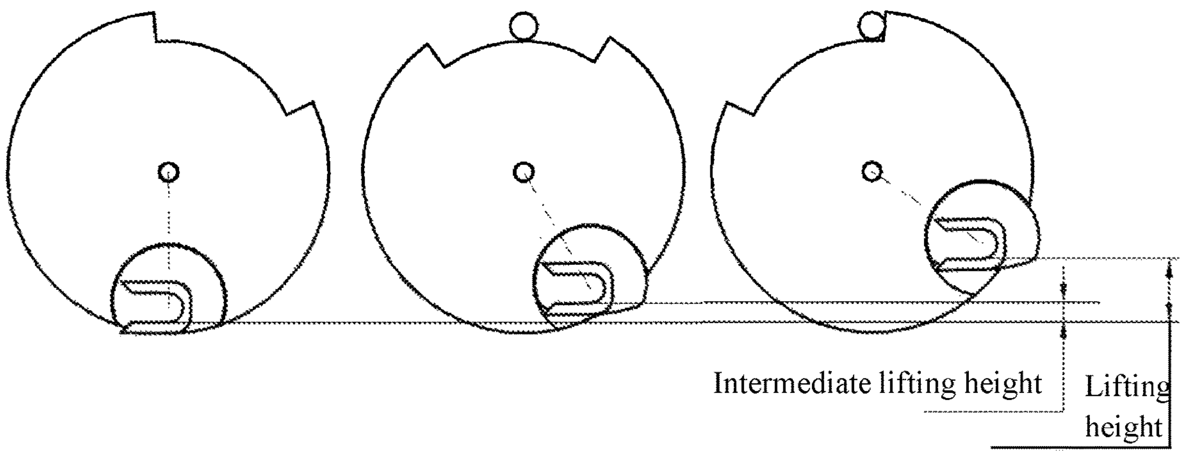
FIG. 17 shows a position of the rotating disc during rotating.
Figure 19:
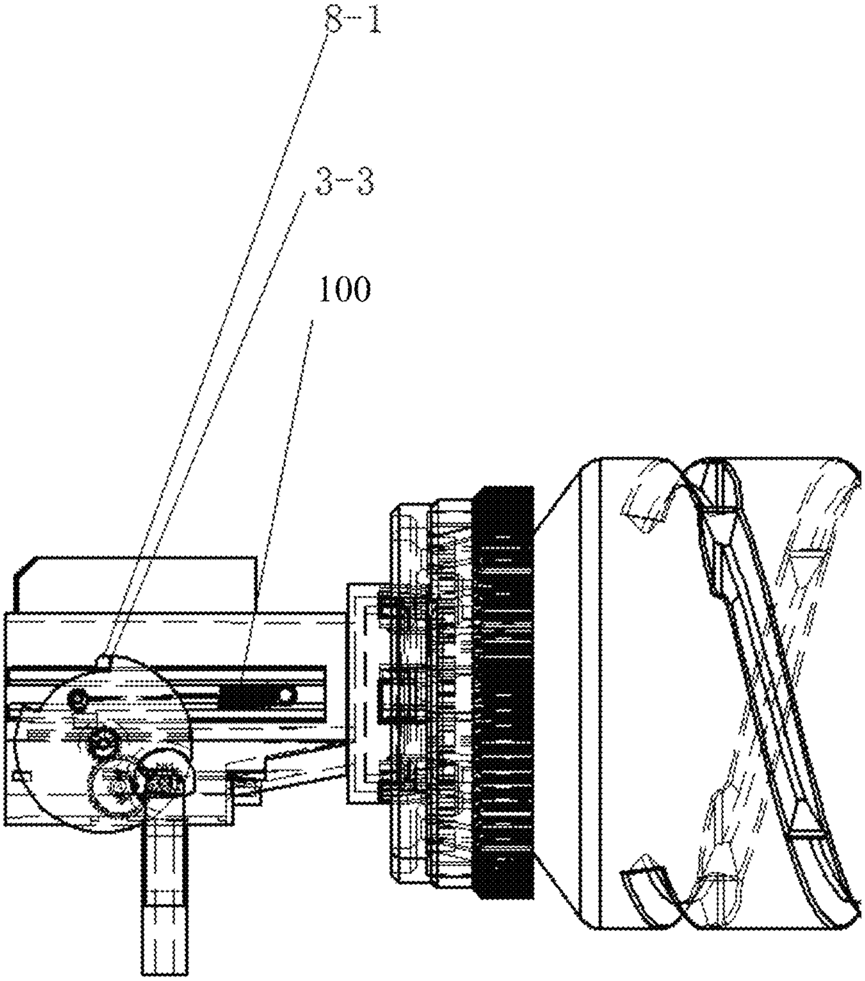
FIG. 19 is a schematic diagram of the rotating disc in another state.

Specifically, the fixed shaft 1-2 of the detent device 1 passes through the detent gear hole 5-1 of the detent gear 5 and is fixed (or is bonded by glue) for transferring the torque; the detent mouth 1-1 rotates clockwise with the detent gear 5 for keeping the mouth direction of the detent mouth 1-1 unchanged during the rotation of the rotating disc 3, so as to prevent the two arms 11-2 of the toner collection device 11 from sliding from the detent mouth 1-1, as shown in FIG. 17; and then, with the toner container 10 is further pushed into the toner collection device 11, the detent mouth 1-1 drives the toner collection device 11 to rise, a highest point that the toner collection device 11 is able to reach when it rises is shown in FIG. 19, the stop rod 8-1 contacts with the first stop notch 3-3, the toner collection mouth 11-1 is fitted closely to and aligned with the toner discharge mouth 10-1 of the toner container 10 for forming the passage.

The unloading process of the toner container 10 is opposite to the loading process. With the toner container 10 is pulled out in the opposite direction of loading, the rotating discs 3 are subjected to the downward pulling force of the toner collection device 11 and the pulling force of the tension spring 100 from the spring rod 3-5 of the rotating disc 3. Under the action of two forces, the rotating disc 3 rotates clockwise, so that under the reaction force, the fixed gear 7 drives the bridge gear 6 to rotate clockwise, for further driving the detent gear 5 to rotate counterclockwise. Since the fixed shaft 1-2 of the detent device 1 is inserted into the detent gear hole 5-1 of the detent gear 5 and is fixed for transferring the torque; the detent mouth 1-1 rotates counterclockwise with the detent gear 5. Simultaneously, the detent mouth 1-1 declines till reaches a lowest point (referring to FIG. 18), the stop rod 8-1 contacts with the second stop notch 3-7, the toner collection mouth 11-1 of the toner collection device 11 is detached from the toner discharge mouth 10-1 of the toner container 10, so that the conveying of the toners is stopped.

Two rotating discs, which are respectively located at two sides of the toner container 10, are cooperated with the toner container 10. The two rotating discs are symmetrical to each other. The above-mentioned rotating disc is located at a left side of the toner container 10.

The above embodiments are only the preferred specific embodiments of the present invention. The phrases “in one embodiment”, “in another embodiment”, “in the other embodiment” or “in other embodiments” in this specification may refer to one or more of the same or different embodiments based on this disclosure. The usual changes and substitutions made by those skilled in the art within the scope of the technical scheme of the present invention shall be included within the protective scope of the present invention.

What is claimed is:

1. A rotating disc for a toner container, the rotating disc comprising:

a rotating disc main body (3-8);

a detent device installed on the rotating disc main body (3-8), wherein the detent device comprises a detent mouth (1-1);

a fixed gear (7) connected with the rotating disc main body (3-8), wherein the rotating disc main body (3-8) is able to rotate relatively to the fixed gear (7);

a detent gear (5) which is linked with the detent device; and a bridge gear (6) which is set between the detent gear (5) and the fixed gear (7), and is engaged with the detent gear (5) and the fixed gear (7) respectively for realizing torque transmission.

2. The rotating disc according to claim 1, wherein:

the rotating disc main body (3-8) has a stop notch at a peripheral edge thereof for limiting a rotating stroke of the rotating disc main body (3-8).

3. The rotating disc according to claim 1, wherein a spring rod (3-5) is located at an inner side of the rotating disc main body (3-8) for connecting with an external spring.

4. The rotating disc according to claim 1, wherein a stop block is set on the fixed gear (7) for preventing the fixed gear (7) from rotating.

5. The rotating disc according to claim 1, wherein the bridge gear (6), which is installed on a bridge gear fixed rod located on the rotating disc main body (3-8), is able to rotate through clearance fit.

6. The rotating disc according to claim 1, wherein the detent device is installed within a trough provided at an outer side of the rotating disc main body (3-8); the fixed gear (7), the detent gear (5) and the bridge gear (6) are all installed at an inner side of the rotating disc main body (3-8).

7. A conveying device for a toner container, the conveying device comprising:

a rotating disc (3) comprising:

a rotating disc main body (3-8);

a detent device located at an outer side of the rotating disc main body (3-8), wherein the detent device comprises a detent mouth (1-1);

a fixed gear (7) connected with the rotating disc main body (3-8), wherein the rotating disc main body (3-8) is able to rotate relatively to the fixed gear (7);

a detent gear (5) which is linked with the detent device; and a bridge gear (6) which is set between the detent gear (5) and the fixed gear (7), and is engaged with the detent gear (5) and the fixed gear (7) respectively for realizing torque transmission; and an upper cover main body (8), which comprises a rotating disc rod (8-2), wherein a second gear and the rotating disc (3) simultaneously pass through the rotating disc rod (8-2).

8. The conveying device according to claim 7, wherein:

a spring rod (3-5) is located at an inner side of the rotating disc main body (3-8) for connecting with an external spring;

a spring plunger (8-3) is set on the upper cover main body (8), and a tension spring (100) is connected between the spring plunger (8-3) and the spring rod (3-5).

9. The conveying device according to claim 7, wherein:

the rotating disc main body (3-8) has a stop notch at a peripheral edge thereof;

a stop rod (8-1) is set on the upper cover main body (8) and is fitted with the stop notch to limit a rotating stroke of the rotating disc.

10. The conveying device according to claim 7, wherein:

the rotating disc main body (3-8) has a stop notch at a peripheral edge thereof for limiting a rotating stroke of the rotating disc main body (3-8);

a spring rod (3-5) is located at an inner side of the rotating disc main body (3-8) for connecting with an external spring.

* * * * *